Dec. 5, 1967    E. F. ZINK    3,356,240
SELF-LOADING VEHICLE
Original Filed Aug. 30, 1961    6 Sheets-Sheet 1

INVENTOR.
EDWARD F. ZINK
BY *E. Wallace Breisch*
ATTORNEYS.

Dec. 5, 1967  E. F. ZINK  3,356,240
SELF-LOADING VEHICLE
Original Filed Aug. 30, 1961  6 Sheets-Sheet 3

INVENTOR.
EDWARD F. ZINK
BY
ATTORNEYS.

Dec. 5, 1967   E. F. ZINK   3,356,240
SELF-LOADING VEHICLE

Original Filed Aug. 30, 1961   6 Sheets-Sheet 4

INVENTOR.
EDWARD F. ZINK
BY
ATTORNEYS.

Dec. 5, 1967  E. F. ZINK  3,356,240
SELF-LOADING VEHICLE
Original Filed Aug. 30, 1961  6 Sheets-Sheet 5

INVENTOR.
EDWARD F. ZINK

BY *E. Wallace Breese*

ATTORNEYS.

United States Patent Office 3,356,240
Patented Dec. 5, 1967

3,356,240
SELF-LOADING VEHICLE
Edward F. Zink, Knoxville, Tenn., assignor, by mesne assignments, to Joy Manufacturing Company, Pittsburgh, Pa., a corporation of Pennsylvania
Application Nov. 5, 1964, Ser. No. 410,824, which is a continuation of application Ser. No. 134,950, Aug. 30, 1961. Divided and this application May 31, 1966, Ser. No. 554,112
9 Claims. (Cl. 214—501)

This application is a divisional of my copending application Ser. No. 410,824, filed Nov. 5, 1964, which is a continuation of application Ser. No. 134,950, filed Aug. 30, 1961, now abandoned.

The present invention relates to self-loading vehicles, particularly self-loading vehicles of the forward crowding loader type having a vertically swinging load support including a front loading shovel that discharges into a front dumping material-receiving body carried by the vehicle, and more particularly to the front dumping body of the vehicle.

It is an object of the present invention to provide a self-loading dump vehicle of the forward dumping type, in which dumping is achieved both in a desirable height above the ground and at a desirable distance forward of the vehicle.

The invention also contemplates the provision of a wheeled self-loading vehicles in which the weight of the load tends to be distributed more uniformly between these sets of wheels.

It is also an object of the present invention to provide a wheeled self-loading vehicle well adapted to traverse uneven terrain.

Finally, it is an object of the present invention to provide a self-loading vehicle which will be relatively economical to manufacture, compact and strong in its construction, rapid and efficient in its operation, and rugged and durable in use.

Other objects and advantages will become apparent from a consideration of the following description, taken in connection with the accompanying drawings, in which.

Figure 1:
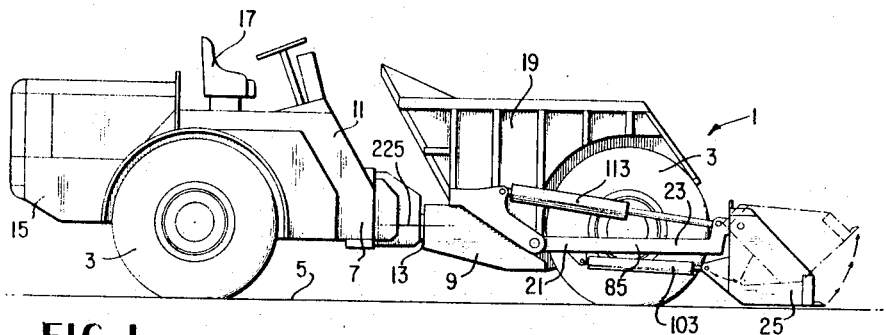
FIGURE 1 is a side elevational view of a self-loading vehicle according to the present invention, showing a vertically swinging load support in a lower position and a shovel in full line in the position it occupies before and during the first stage of loading the shovel and in phantom line in the position that it occupies after the shovel is loaded.
Figure 2:
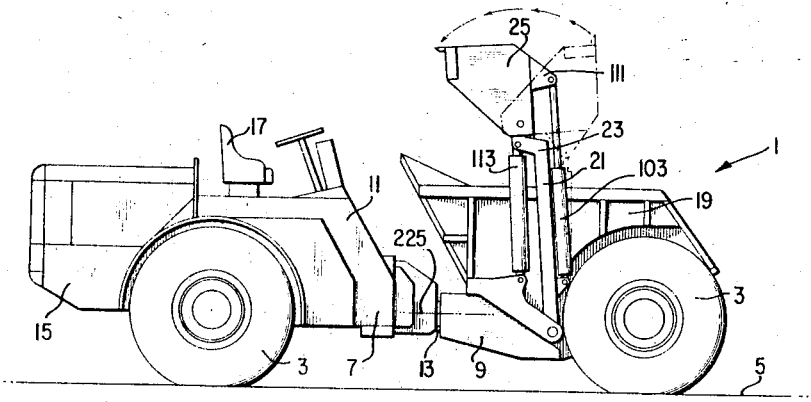
FIGURE 2 is a view similar to FIGURE 1 but showing the vertically swinging load support in an upper position with the shovel position before the shovel is unloaded shown in phantom line and the shovel position while the shovel is being unloaded and after the shovel has been unloaded shown in full line.
Figure 3:
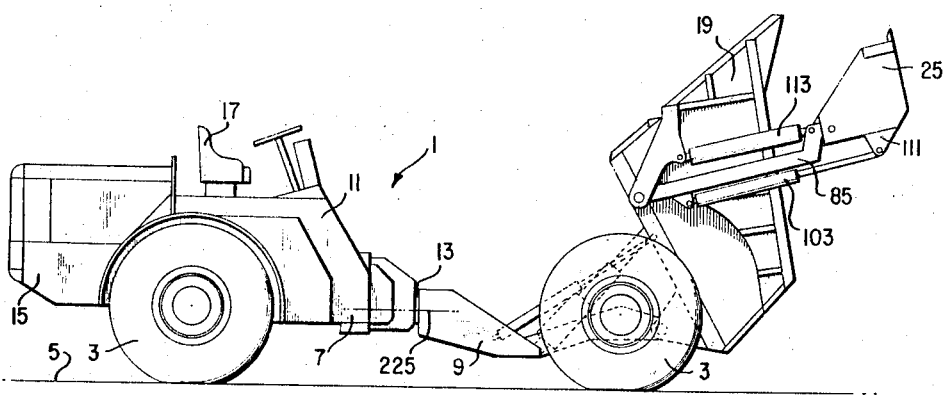
FIGURE 3 is a view similar to FIGURES 1 and 2 but showing the material-receiving body in dumping position.

Referring now to the drawings in greater detail, the broad outline of the invention can be seen on the first sheet of the drawings by comparison of FIGURES 1, 2 and 3. As will be apparent from a construction of these figures, the present invention comprises a self-loading vehicle indicated generally at 1, supported by four wheels 3 on a level surface 5 such as the ground or the concrete flooring of a storage building or the floor of a mine or the like. Vehicle 1 has a chassis 7 comprised of a front chassis portion 9 and a rear chassis portion 11, the front wheels 3 being mounted on the front chassis portion and the rear wheels 3 being mounted on the rear chassis portion for rotation about horizontal parallel axes.

Chassis portions 9 and 11 are interconnected intermediate the length of the vehicle by means of a swivel joint 13 for rotation relative to each other about a horizontal axis extending in the direction of movement of the vehicle. Preferably, the axis of swivel joint 13 is coplanar with but perpendicular to the axes of wheels 3, and is disposed midway between the wheels of each pair of wheels 3.

Rear chassis portion 11 carries an engine 15 for rear wheel drive, and also carries an operator's station 17 that faces front, that is, in the direction of loading, during loading. Station 17 includes the usual seat and steering wheel, but the seat can swivel and dual controls are provided so that the operator can turn and face the other way for better visibility during vehicle travel. Front chassis portion 9 carries a material-receiving and storing body comprising a dump body 19 and a vertically swinging load support 21. Load support 21 includes a pair of arms 23 mounted on dump body 19 for vertical swinging movement about a horizontal axis. Arms 23 carry a front loading shovel 23 at their outer ends. The vertically swinging load support is thus mounted on and moves with dump body 19 but also swings vertically relative to dump body 19.

The broad outline of the operation of the device is indicated sequentially in FIGURES 1, 2 and 3. As seen in FIGURE 1, the vehicle moves close to the material to be loaded with the shovel in the lowered full line position of FIGURE 1. The vehicle is then crowded forward to load the front portion of the shovel without undue crowding effort. Then, with the vehicle stationary, shovel 25 is swung foward and upward from the full line to the phantom line position of FIGURE 1 to complete the loading of the shovel. From the phantom line position of FIGURE 1, the shovel and vertically swinging load support are then swung upward to the phantom line position of the shovel shown in FIGURE 2. The shovel is then swung to the full line position shown in FIGURE 2, whereupon shovel 25 dumps into dump body 19. The vertically swinging load support is returned to lowered position and the loading operation is repeated as needed until the dump body contains the desired load, whereupon the vehicle can be driven from the loading station to the dumping station. When the material in the dump body has been carried to its destination, the dump body can be swung forwardly upward as seen in FIGURE 3 to unload the dump body. The vertically swinging load support is in raised position relative to the dump body and swings with the dump body during dumping movement of the dump body so as not to interfere with the discharge of material from the dump body.

Figure 4:
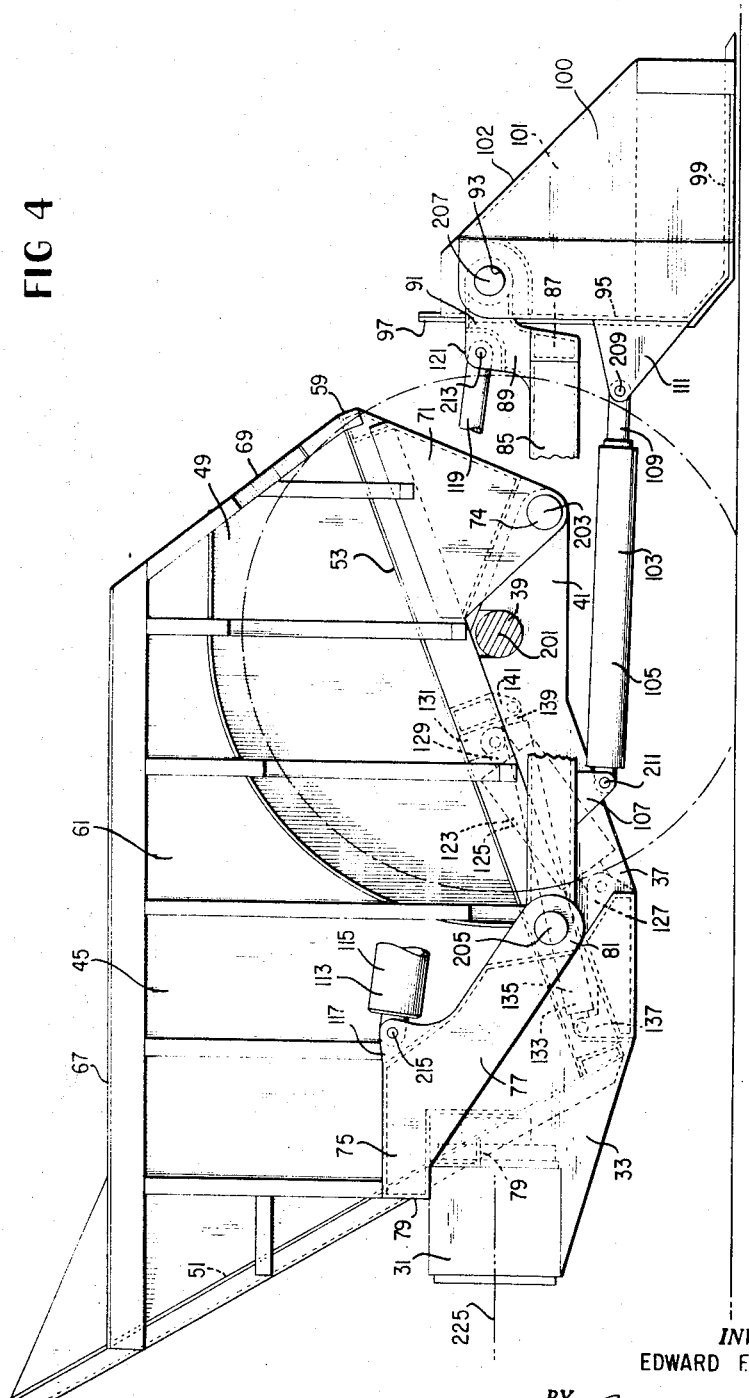
FIGURE 4 is a side view partly in section and with parts broken away, of the forward chassis portion of a self-loading vehicle according to the present invention, showing the dump body and the vertically swinging load support in lowered position.
Figure 7:
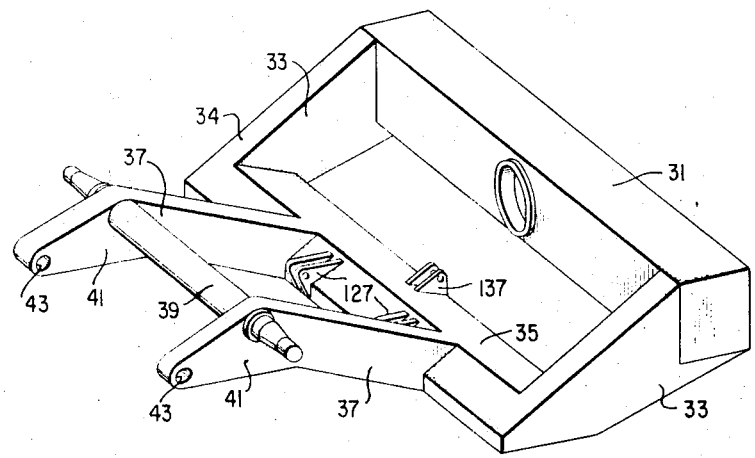
FIGURE 7 is a perspective view of the forward chassis portion of the present invention.
Figure 8:
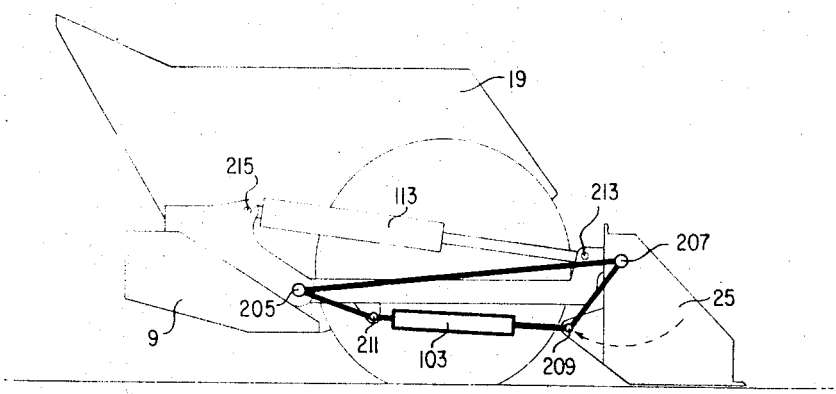
FIGURE 8 is a diagrammatic view illustrating certain mechanical relationships between the principal parts of the vertically swinging load support.
Figure 9:
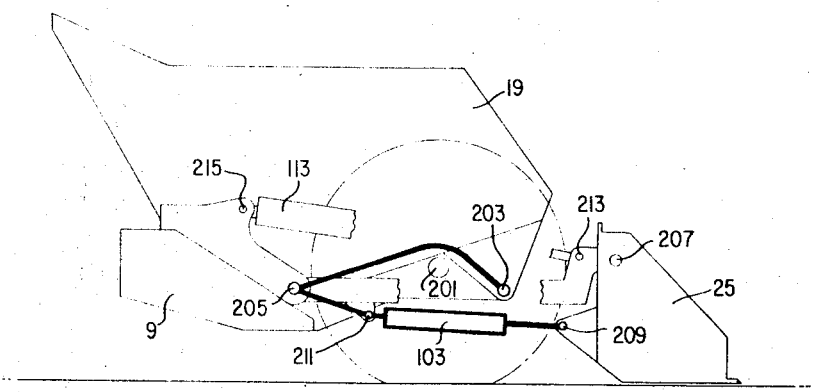
FIGURE 9 is a view similar to FIGURE 8 but showing certain relationships between the vertically swinging load support and the vertically swinging dump body.

Referring now to the vehicle structure in greater detail, front chassis portion 9 is best seen in FIGURES 4 and 7 to include a rear horizontal transverse base member 31 that houses a portion of swivel joint 13 in its midportion and that terminates at its ends in forwardly and downwardly extending arms 33 having forwardly downwardly inclined upper surfaces 34. Arms 33 terminate at their lower ends in a cross piece 35 that rigidly interconnects them. A pair of arms 37, spaced apart a distance considerably less than arms 33, extends forwardly upward from the forward upper side of cross piece 35. Closer to their free ends than to their rear ends, arms 37, carry a wheel axle 39 that extends between the uppermost portions of arms 37 and rigidly interconnect arms 37. Axle 39 is thus a brace that integrates arms 37 into a rigid box frame chassis portion. Axle 39 extends endwise outward beyond arms 37 on each side to provide mountings for the front wheels 3 one on each end of axle 39. Arms 37 continue on beyond axle 39 in downwardly forwardly extending ends 41 that terminate at a level somewhat below axle 39 in openings 43 for the reception of pivot pins by which the dump body is mounted for vertical swinging movement on and relative to arms 37.

Front chassis portion 9 is hollow, not only to reduce its weight without much loss of strength, but also to provide a housing for the hydraulic lines that actuate the mechanisms to be described below.

Figure 5:
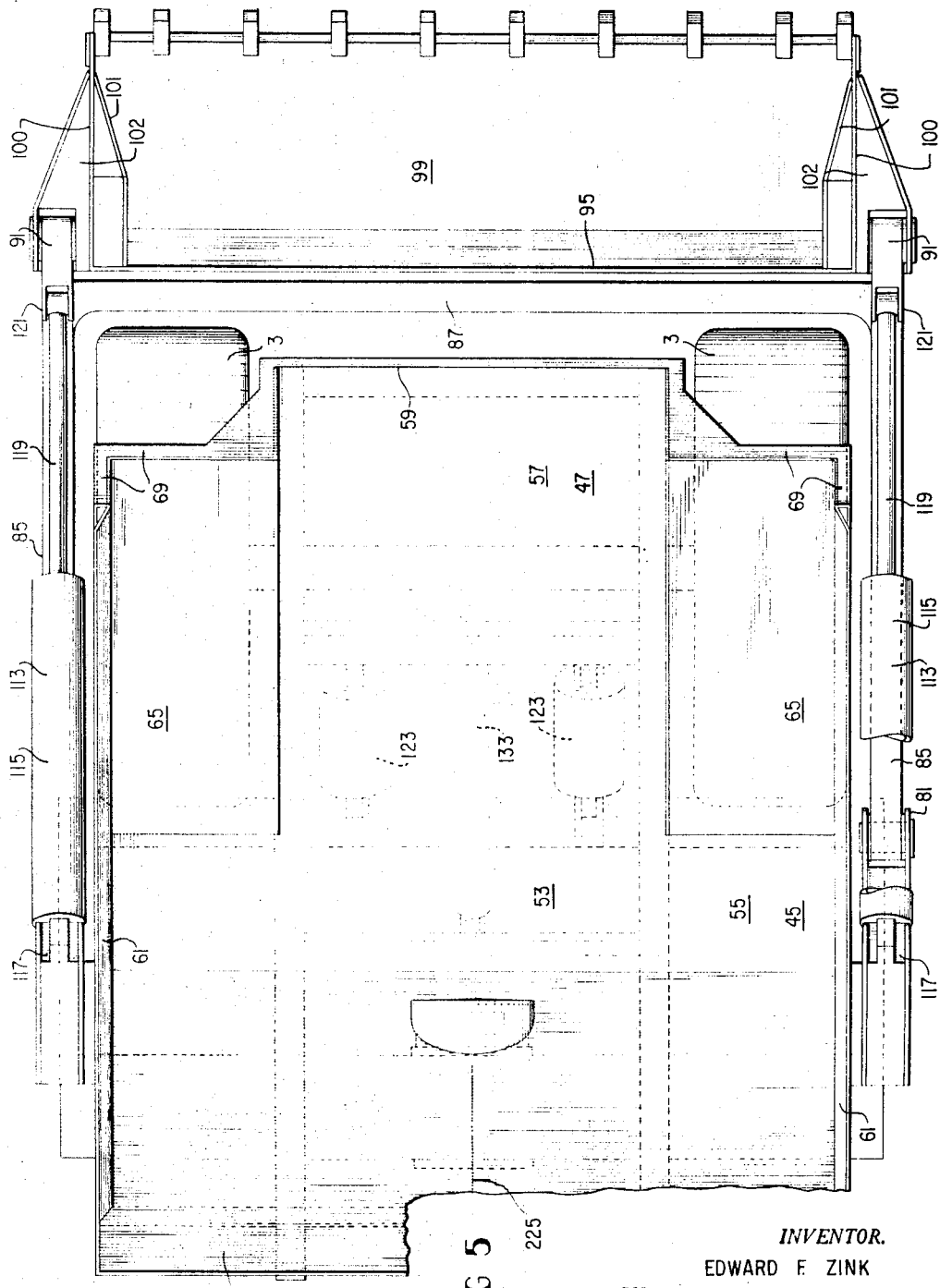
FIGURE 5 is a plan view of the structure shown in FIGURE 4.
Figure 6:
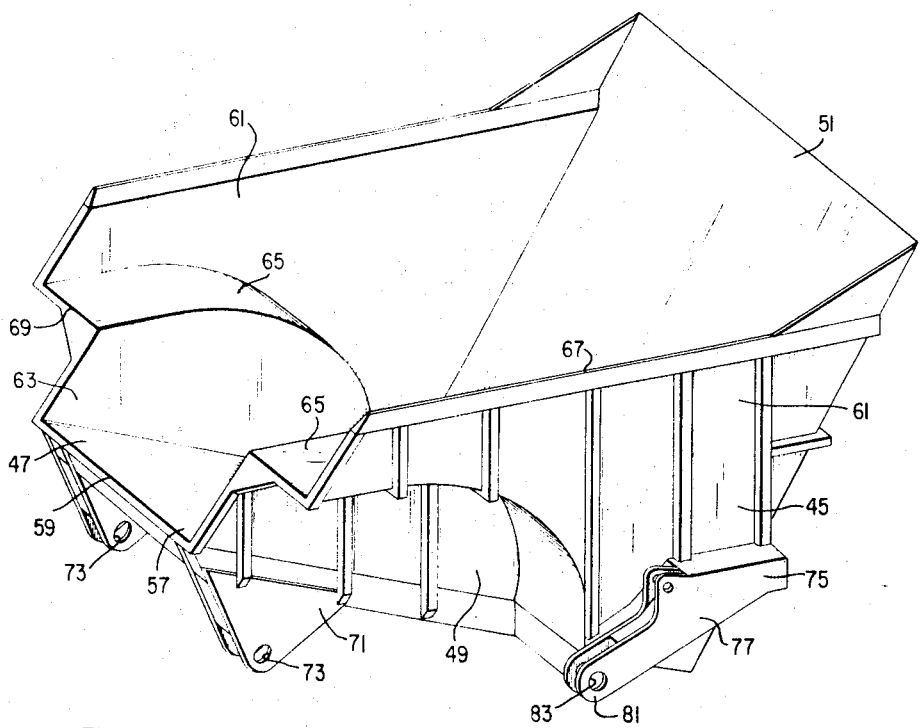
FIGURE 6 is a perspective view of the dump body of the present invention.

Dump body 19 is best seen in FIGURES 4, 5 and 6 to include a relatively wide body portion 45 at the rear of the dump body and a relatively narrow body portion 47 at the front of the dump body, the front of the dump body being on the right side of FIGURES 4 and 5 and on the left side of FIGURE 6. Dump body 19 is characterized by a pair of wheel recesses 49 one on either side of narrow body portion 47 at the front of the dump body, and a front wheel 3 is disposed in each wheel recess 49 as perhaps best seen in FIGURE 5. The provision of wheel recesses 49 in combination with wide body portions 55 to the rear thereof contributes greatly to lowering the center of gravity of the loaded vehicle.

Dump body 19 is closed at its rear by a rear wall 51 that extends from its upper edge at the highest portion of the dump body forwardly downward to its lower edge at the lowermost portion of the dump body as best seen in FIGURE 4. A bottom wall 53 extends forwardly from the bottom of rear wall 51 and has a relatively wide rear portion 55 that forms part of the bottom of wide body portion 45, and a relatively narrow front portion 57 between recesses 49 that forms the bottom of relatively narrow body portion 47. Front portion 57 terminates at its front in a forward lip 59. Bottom wall 53 is forwardly upwardly inclined from rear wall 51 to lip 59.

Dump body 19 also has side walls having relatively widely spaced apart side wall portions 61 bounding wide body portion 45 and relatively closely spaced side wall portions 63 between recesses 49. Arcuate hoods 65 overlie wheel recesses 49 and interconnect side wall portions 61 and 63 on each side of dump body 19. The relatively widely spaced side wall portions 61 terminate upward in upper edges 67 that are horizontal when the dump body is in its lowermost position as seen in FIGURE 4. Widely spaced side walls 61, closely spaced side walls 63 and arcuate hoods 65 terminates to the front in forward edges 69 which are downwardly forwardly inclined as seen in FIGURE 4.

Brackets 71 are secured to the front portions of the lower side edges of relatively narrow front portion 57, roughly in the vertical planes of relatively closely spaced side wall portions 63. Brackets 71 at their lower forward portions are provided with aligned openings 73 for the reception of pivot pins that pass through openings 73 on the dump body and 43 on the chassis swingably to interconnect dump body 19 and front chassis portion 9. Wheel axle 39 is disposed as high as possible in the crotch between bottom wall 53 and brackets 71, and bottom wall 53 and brackets 71 extend substantial distances diagonally downward on either side of wheel axle 39.

Secured to the sides and rear of dump body 19 is a U-shaped yoke 75 having forwardly downwardly extending arms or thrust pads 77 which are interconnected at their rear ends by horizontal and vertical thrust bearing members 79 that extend across and are secured to rear wall 51 of dump body 19. Arms 77 on their undersides have downwardly forwardly inclined surfaces that have wide surface contact with upper surfaces 34 of arms 33 of front chassis portion 9, so that in effect at least the rear portion of dump body 19 rests on front chassis portion 9 through these interengaged diagonally disposed surfaces of arms 33 and 77. Rear thrust bearing members 79 also have horizontal and vertical surfaces in contact with horizontal and vertical surfaces, respectively, of base member 31 of front chassis portion 9 when the dump body is in its lowered position as seen in FIGURE 4.

Arms 77 terminate downward in lugs 81 having openings 83 therethrough disposed below the plane of bottom wall 53 for the reception of pivot pins by which the arms 23 of vertically swinging load support 21 are mounted on dump body 19 for vertical swinging movement about a horizontal axis parallel to the axis of vertical swinging movement of dump body 19. It is to be noted that yoke 75 thus has extensive areas of contact with front chassis portion 9.

Arms 23 of vertically swinging load support 21 have major rear portions 85 that are straight and roughly horizontal in their lower positions as seen in FIGURE 1. At the outer ends of major portions 85, a crosstie 87 extends between and rigidly interconnects the arms 23 on either side of dump body 19. Crosstie 87 is thus a brace that integrates arms 23 into a rigid vertically swinging load support. Arms 23 have upwardly extending portions 89 above crosstie 87 and these upwardly extending portions 89 in turn terminate outward in horizontal forwardly extending portions 91 which are provided at their forward ends with eligned openings 93 for the reception of pivot pins by which shovel 25 is mounted on the outer ends of arms 23 for vertical swinging movement about a horizontal axis relative to arms 23.

Shovel 25 has a rear wall 85 that is vertically disposed when the vertically swinging load support is in its lower position shown in FIGURE 4. Rear wall 95 terminates upward in a lip 97 which extends above and is disposed behind the pivot of the shovel on the arms. Nevertheless, the shovel pivot is also in an upper rear portion of the shovel. The shovel also has a bottom wall 99 that is horizontal in the position of FIGURE 4 and which terminates at the front in a toothed digging edge. Rear wall 95 and bottom wall 99 are interconnected by side walls 100.

In order to accommodate the pivotal mounting of bucket 25 on arms 23, a generally triangular plate 101 is secured to the inner side of each side wall 100 with a lower horizontal edge of plate 101 connected to side wall 100 and the remainder of plate 101 diverging upward from side wall 100 so that plates 101 converge upward in the lower shovel position shown in FIGURES 4 and 5. Thus, the width of the bottom of rear wall 95 is greater than the width of the top of rear wall 95. Another plate 102 diverges rearwardly outward from plate 100. Forward portion 91 of arm 23 is disposed between side wall 100 and plate 102 and the pivot pin is carried by both of those members. Arms 23, and indeed all the mechanism on the outer sides of front wheels 3, are thus protected from damage by the relatively wider portions of the shovel, for the operating mechanism of the vertically swinging load support is in effect masked by the shovel from the front. Also, the assembly of members 100, 101 and 102 provides a strong support for the pivot pins on which the shovel is largely supported.

It is thus significant to note that the pivotal mountings of shovel 25 on arms 23 are in front of rear wall 95, below upper lip 97, above bottom wall 99 and between plates 102.

In addition to masking the operating mechanism, the assembly of side wall 100 and plates 101 and 102 performs a function at least equally important, when the shovel is in an upper position such as the full line position of FIGURE 2, for in that raised position the plates 101 converge downward to direct material falling from the shovel toward the center of material receiving body 19. The vertical swinging movement of arms 23 turns shovel 25 through 90° between the full line position of FIGURE 1 and the phantom line position of FIGURE 2. Moreover, shovel 25 can be turned another 90° relative to arms 23. As a result, shovel 25 turns 180° relative to the vehicle during its loading movement, so that plates 101 are inverted and their convergence reversed.

Hence, plates 101 and 102 perform a dual function: in the full line position of FIGURE 1 they help mask the operating mechanism, but in the full line position of FIGURE 2 they funnel the material toward the center of body 19. Not only does this funnelling action of the shovel prevent spillage from the sides of body 19, but also it permits the use of a shovel wider than body 19 for increased shovel capacity, as is apparent from FIGURE 5.

Means are provided for swinging shovel 25 vertically about its pivot relative to arms 23, comprising a fluid motor 103 mounted below each arm 23 and acting between a point on the arm below the arm, and a point on the shovel a substantial distance below the pivot of the shovel on arms 23. Specifically, each motor 103 includes a cylinder 105 mounted for vertical swinging movement about a horizontal axis at its rear end on ears 107 that depend from arms 23 adjacent the rear of those arms. A piston and piston rod assembly 109 rides in cylinder 105 and is connected at its forward end to ears 111 which are secured to rear wall 95 of shovel 25 at the lower outer ends thereof. The pivots of motors 103 on the shovel, like the pivots of arms 23, are masked from the front by the shovel.

Flexible fluid conduits (not shown) interconnect both ends of cylinder 105 with a conventional fluid motive system (not shown) including a pump driven by engine 15, a fluid supply chamber and a suitable valve bank operable from the operator's station selectively to direct fluid under pressure to, or to exhaust fluid from, either end of cylinder 105. The handling of the fluid of the fluid system of the present invention is conventional and need not be described in detail. Suffice it to say that to move the shovel from the full line to the phantom line position in FIGURE 1, or from the phantom line to the full line position of FIGURE 2, pressure fluid is admitted to the side of the piston opposite the shovel and fluid is exhausted from the cylinder on the same side of the piston as the shovel. If desired, pressure fluid can also be diverted to the other end of the cylinder to move the shovel from the full line to the phantom line position of FIGURE 2 at the end of the loading movement of the vertically swinging load support.

When the shovel has been loaded by the operation of fluid motor 103, the vertically swinging load support is then swung up to the full line position shown in FIGURE 2, the shovel being first brought to the phantom line position of FIGURE 2 and then to the full line position of FIGURE 2, in order to place the material farther to the rear of the dump body. This vertical swinging movement of arms 23 is effected by operation of fluid motors 113 driven by the fluid system described above and disposed one above each arm 23, and each comprising a cylinder 115 pivoted about a horizontal axis on ears 117 on arms 77 of yoke 75 on dump body 19. A piston and piston rod assembly 119 rides in cylinder 115 and is secured to and acts on arm 23 at the juncture of upwardly extending portion 89 and horizontal portion 91 of arm 23 through ears 121 at that point, to which piston and piston rod assembly 119 is pivotally connected for relative vertical swinging movement.

After dump body 19 has been filled by repeated swings of vertically swinging load support 21, the vehicle is driven from the loading station to the dumping station. Dumping is effected by swinging dump body 19 up and forward about its pivotal mounting on the forward downturned ends 21 of front chassis portion 9. To this end, a pair of fluid motors 123 are provided which may if desired be of the multiple cylinder type in order to be sufficiently extensible and may thus include concentric telescoping cylinders 125 mounted at their rear ends for vertical swinging movement about horizontal axes provided by ears 127 carried by a forward portion of cross piece 35 of front chassis portion 9 between arms 33 thereof, as seen in FIGURES 4 and 7. A piston and piston rod assembly 129 moved by fluid motor 123 connects at its forward end for vertical swinging movement with and relative to ears 131 secured to the underside of dump body 19. Pressure fluid from the fluid system described above is supplied to at least the side of the piston of fluid motor 123 away from the dump body thereby to raise the dump body up to the full dump position shown in FIGURE 3, in which the center of gravity of the empty dump body is disposed forward of the axis of swinging movement of the dump body.

In order to snub the forward movement of dump body 119 over center, and to initiate the return of the dump body to its lowered position, a further fluid motor 133 is provided between the front chassis portion and the dump body, comprising a cylinder 135 pivotally mounted for vertical swinging movement about a horizontal axis adjacent its rear end on ears 137 on a rear portion of cross piece 35 midway between arms 33 on front chassis portion 9, as seen in FIGURES 4 and 7. A piston and piston rod assembly 139 rides in cylinder 135 and acts on the underside of dump body 19 through ears 141 by which the piston rod is connected to the dump body for relative vertical swinging movement about a horizontal axis. Pressure fluid from the fluid system described above is supplied to at least the same side of the piston of motor 133 as dump body 19, thereby to provide a cushion for at least the last portion of the forward swinging movement of dump body 19 over center, and to initiate return from the fully swung position of FIGURE 3 over center to the point that cylinders 125 can take over to return dump body 19 to its lowermost position as in FIGURE 1, whereupon the loading operation may be repeated.

It will be apparent that there are 13 horizontal axes of vertical swinging movement of different portions of the structure described hereinbefore, which axes are related to each other, and that the essential operative relationships of the movement of dump body 19 of the present invention can be expressed in terms of the position and movement of the axes related to dump body 19. These 13 axes are as follows:

Axis 201, the axis about which the front wheels 3 rotate on an axle 39.

Axis 203, the axis of vertical swinging movement of dump body 19 and also of the axis of openings 43 and 73.

Axis 205, the axis of vertical swinging movement of vertically swinging load support 21 and also the axis of openings 83.

Axis 207, the axis of vertical swinging movement of shovel 25 relative to arms 23 and also the axis of openings 93.

Axis 209, on which lie the points of articulation between fluid motors 103 and shovel 25 on ears 111.

Axis 211, on which lie the points of articulation between fluid motors 103 and arms 23 on ears 107.

Axis 213, on which lie the points of articulation between fluid motors 113 and arms 23 on ears 121.

Axis 215, on which lie the points of articulation between yoke 75 and fluid motors 113 and on ears 117.

Figure 10:
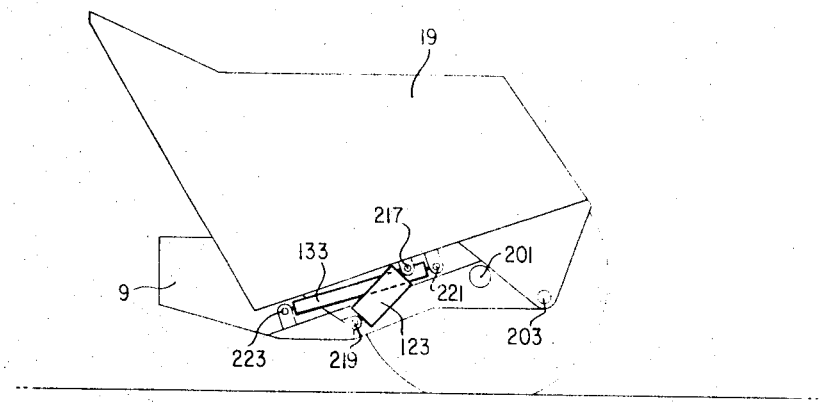
FIGURE 10 is a diagrammatic view illustrating the dumping mechanism in a lower position of the dump body.
Figure 11:
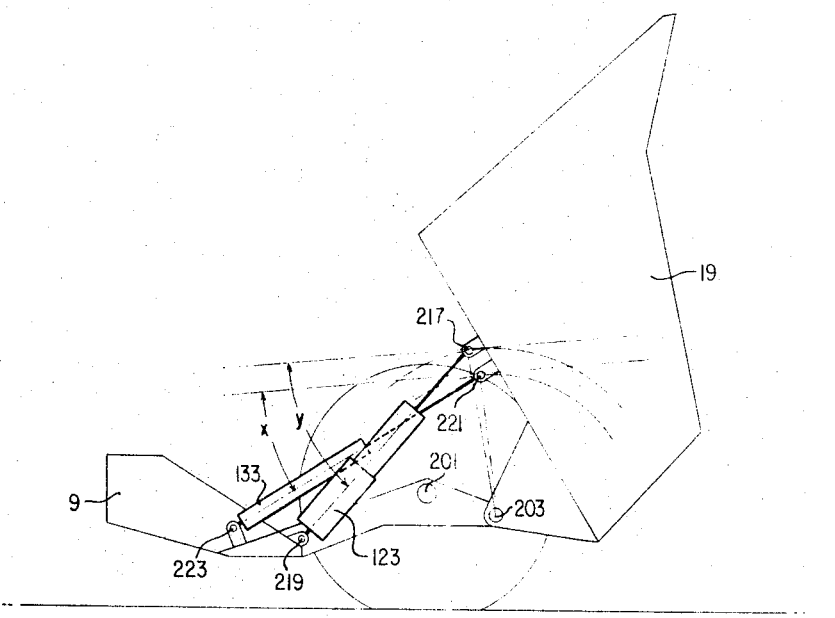
FIGURE 11 is a view similar to FIGURE 10 but showing the parts in full dumping position and illustrating certain relationships between the principal parts of the dumping mechanism.

Axis 217, on which lie the points of articulation between fluid motors 123 and dump body 19 on ears 131, as best seen in FIGURES 4, 10 and 11.

Axis 219, on which lie the points of articulation between front chassis portion 9 and motors 123 on ears 127.

Axis 221, on which lies the point of articulation between fluid motor 133 and dump body 19 on ears 141.

Axis 223, on which lies the point of articulation between fluid motor 133 and front chassis portion 9 on ears 137.

Axis 225, the axis about which front and rear chassis portions 9 and 11 swivel relative to each other and which runs lengthwise of the vehicle in the direction of vehicle movement.

All of these axes are normally horizontal. Axes 201–223 are all parallel to each other. Axes 203–225 are all axes of vertical swinging movement of portions of the vehicle relative to other portions.

Dealing now with the significance of these axes, and first with regard to axis 201, the wheel axis, it should be noted that most of dump body 19 is to the rear of the vertical plane that includes this axis, particularly the wide body portion of the dump body. This assures that a great deal of the weight of the loaded dump body will be borne by the rear wheels as well as by the front wheels. Even distribution of the load among the wheels makes possible the use of tires of minimum size.

It should also be noted that a portion of dump body 19 is at a lower level than the horizontal plane that includes axis 201 whereby the center of gravity of the loaded dump body is as low as possible. The floor of dump 19 thus extends from a lowermost rear portion substantially below axis 201 to an uppermost front portion above axis 201, axis 201 being disposed as close to the floor as is possible consistent with the vehicle structure.

It should be particularly noted that the axis 203, the dump body axis, is below and forward of axis 201. Positioning axis 203 below and forward of axis 201 assures that upon dumping movement, the front lip of the dump body will move forward as well as downward, for a distance such that the dumped material will clear the wheels and at the same time the material will be dumped from a height sufficient to clear low retaining walls and the like. Dumping sufficiently far forward and at a sufficient elevation could also be achieved by moving axis 203 forward, or forward and upward, but moving axis 203 forward would require lengthening the shovel arms, and this in turn would make the shovel swing higher to load the dump body, which in turn would increase the head room required for the operation of the vehicle. Moving axis 203 forward would also increase the height to which dump body 19 rises upon dumping, which would again increase the needed head room. Moving axis 203 forward and upward would still further increase the height to which dump body 19 swings during dumping.

The interrelationship of the structure of the vehicle described hereinbefore and the axes 201, 203, 205, 207, 209, 211, 213, 215 and 225 is the subject matter of the referred to copending patent application Ser. No. 410,824, filed Nov. 5, 1964.

The position of axes 217, 219, 221 and 223 are particularly important relative to each other and relative to the position of axis 203, and their positions are also important relative to the position of axis 201. The relationships of these axes to each other and to the structure of the invention are best illustrated in FIGURES 10 and 11. Axes 217 and 221, which mark the points at which motors 123 and 133, respectively, act on dump body 19, are as high and as far front as possible without interfering with axle 39 that marks axis 201, and axis 217 is farther from axis 203 than is axis 221. In this way, the axes of motors 123 in the lowered position of the dump body shown in FIGURE 10 are at the greatest possible angle to the plane which includes axes 203 and 217. For this same purpose, axis 219 is substantially closer to axis 203 than is axis 223, these latter two axes including the points at which motors 123 and 133, respectively, act on the vehicle.

In raised position, however, and more particularly in the full dump position shown in FIGURE 11, the relationship of the positions of fluid motors 123 and 133 relative to the dump body is reversed, and in this latter instance the axis of motor 133 is nearly perpendicular to the plane which includes axes 203 and 221, while the axes of motors 123 form a much smaller angle with their corresponding reference plane including axes 203 and 217.

The ideal arrangement of the fluid motors would be that the axes of motors 123 are perpendicular to the plane including axes 203 and 217 in the position of FIGURE 10 while the axis of motor 133 is perpendicular to the plane including axes 203 and 221 in the position of FIGURE 11. However, this relationship is not practically obtainable in the limited space available. Hence, the motors are positioned as favorably as possible in the limited space available.

The axes 217 and 221, which move during dumping in arcs concentric with axis 203, have loci which are indicated in FIGURE 11 by dotted arcs. Ideally, the axis of motor 133 should coincide with the tangent to the locus of axis 221 at the position of axis 221 when dump body 19 is in the full dump position of FIGURE 11. Short of this, however, the axis of motor 133 should form as small an angle $x$ as possible with that tangent, as seen in FIGURE 11. Considering the axes of motors 123 to form an angle $y$ with their corresponding tangents in that full dump position, the desired relationship between the axes of the fluid motors and the loci of their respective points of action against the dump body is that the secant of angle $x$ should be substantially less than the secant of angle $y$. In the illustrated embodiment, in which dump body 19 tilts through about 70° of arc to dump, sec. $x$ is equal to about 1.1 and sec. $y$ is equal to about 1.3. If $x$ were equal to 0, sec. $x$ would of course be 1.0. By the same token, in the lowered position of the dump body shown in FIGURE 10, the relationship of the secants of angles $x$ and $y$ is reversed, and the secant of angle $y$ is substantially less than the secant of angle $x$.

From a consideration of the foregoing disclosure, it will be obvious that all the initially recited objects of the present invention have been achieved.

Although the present invention has been described and illustrated in connection with preferred embodiments, it is to be understood that modifications and variations may be resorted to without departing from the spirit of the invention, and those skilled in this art will readily understand. Such modifications and variations are considered to be within the purview and scope of the present invention as defined by the appended claims.

What I claim is:

1. In a self-loading vehicle comprising, a support frame member having a forward end spaced along a first axis from a rearward end; ground engaging traction means for said frame member being movable about a generally horizontal second axis extending transversely of said first axis and located intermediate said ends; a material receiving body member supported by said frame member for pivotal movement from a lowermost position to a dump position about a generally horizontal third axis located forwardly of said second axis, said body member having an open forward end portion and a closed rearward end portion and a bottom portion extending progressively from said rearward end portion at a position below and rearwardly of said second axis to said forward end portion at a position above and forwardly of said axis; shovel means mounted on one of said members for loading material into said body member; and actuating means supported by said frame member and operative with said body member for pivoting said body member from said lowermost position to said dump position and from said dump position to said lowermost position, said actuating means including means for snubbing said body when the movement thereof approaches said dump position.

2. A self-loading vehicle as set forth in claim 1 wherein said actuating means includes first drive means for pivoting said body member from said lowermost position to said dump position and second drive means for snubbing said body member when the movement thereof approaches said dump position and for initiating movement of said body member from said dump position to said lowermost position.

3. A self-loading vehicle as set forth in claim 1 wherein said second and third axes are substantially parallel to each other.

4. A self-loading vehicle as set forth in claim 1 said third axis is located forwardly of and below said second axis.

5. A self-loading vehicle as set forth in claim 2 wherein said body member is supported for pivotal movement about said second axis from said lowermost position through a generally vertical plane that includes said second axis and beyond said plane to said dump position; said first and second drive means are fluid pressure operated.

6. A self-loading vehicle as set forth in claim 4 wherein said first drive means is an elongated fluid pressure operated extensible and retractable cylinder; said second drive means is an elongated fluid operated extensible and retractable cylinder.

7. A self-loading vehicle as set forth in claim 6 wherein said first drive means is operative with said body member at a first point which moves through a first arcuate locus; said second drive means is operative with said body member at a second point which moves through a second arcuate locus, the tangent to said first locus through said first point forming a first angle with the longitudinal axis of said first drive means in said dump position, the tangent of said second locus through said second point forming a second angle with the longitudinal axis of said second drive means in said dump position and the secant of said second drive means in said dump position and the secant of said second angle being substantially less than the secant of said first angle.

8. A self-loading vehicle as set forth in claim 1 wherein said actuating means is an elongated fluid operated double acting extensible and retractable cylinder.

9. A self-loading vehicle as set forth in claim 7 wherein said first and second points lie in generally vertical and second planes respectively, said second plane is located closer to said second axis than is said first plane when said body member is in said lowermost position.

References Cited
UNITED STATES PATENTS

| | | | |
|---|---|---|---|
| 2,148,798 | 2/1939 | Barrett | 298—20 |
| 2,326,594 | 8/1943 | Wood | 298—22 |
| 2,624,478 | 1/1953 | Kaplan | 214—501 X |
| 2,752,193 | 6/1956 | Kling | 298—5 X |

FOREIGN PATENTS 114,148 10/1941 Australia.

GERALD M. FORLENZA, *Primary Examiner.*

ALBERT J. MAKAY, *Examiner.*